July 24, 1962  R. S. LITYNSKI ET AL  3,046,465
NON-LINEAR INTEGRATOR AND CORRECTIVE CONTROL SYSTEM
Filed Dec. 29, 1958
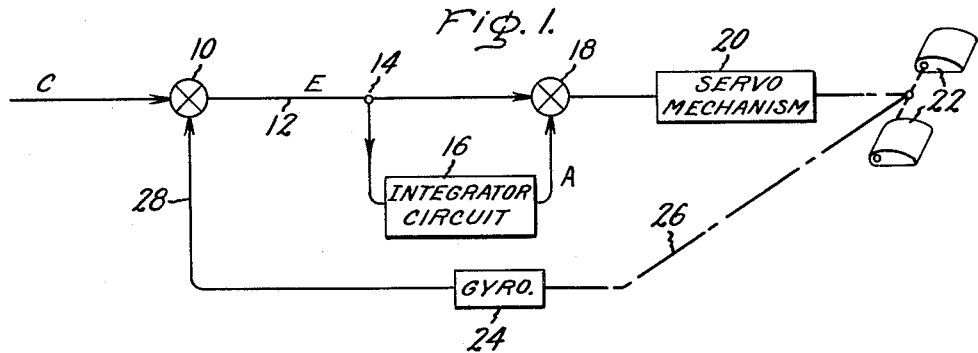
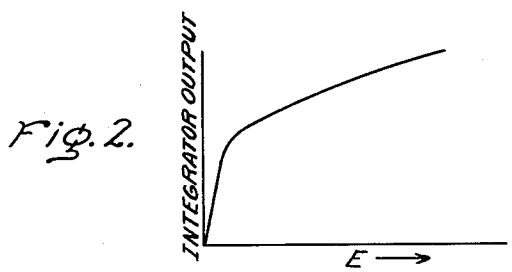
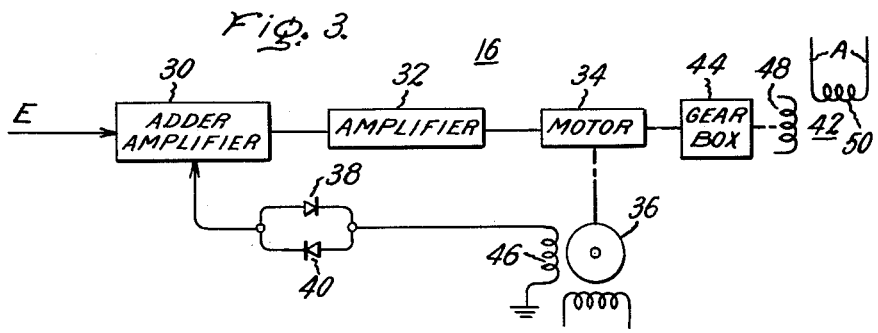
*Inventors:*
*Michael F. Marx,*
*Raymond S. Litynski,*
by *Francis K. Doyle*
*Their Attorney.*

# United States Patent Office 3,046,465
Patented July 24, 1962

3,046,465
NON-LINEAR INTEGRATOR AND CORRECTIVE CONTROL SYSTEM
Raymond S. Litynski, Schenectady, and Michael F. Marx, Rexford, N.Y., assignors to General Electric Company, a corporation of New York
Filed Dec. 29, 1958, Ser. No. 783,270
2 Claims. (Cl. 318—489)

This invention relates to an integrator and more particularly to an integrator which is provided with non-linear gain characteristics for use in a control system or the like.

In present day control systems, such as automatic pilots and the like, a command signal is utilized to operate the control system to perform a desired function of the device on which the control system is mounted. These control systems generally utilize a feedback means from the output of the device which is controlled, this feedback signal being compared with the control signal and the difference between the two, which is an error signal, being utilized to continue the operation of the control system to perform the desired function. When the control system has obtained the desired function or output of the device to which it is attached, then the feedback signal will exactly match the control signal and there will be no error remaining in the control system. In many such control systems, the operation of the device to be controlled will require a varying signal, depending upon its operating or environmental load conditions, in order to obtain the desired function or output. In such instances it is desired to provide the control system with an integrator, whereby the integrator provides a constant output signal after the error has been brought to zero to thereby constantly maintain a signal in the control system to obtain the desired function or output. For example, in an automatic pilot which is being used to compensate for changes in trim of the airplane, such as in a pitch rate command system, since the air speed, altitude, and other factors of the aircraft will require different positions of an elevator to provide zero pitch rate to the aircraft, an integrator is utilized to supply the steady signal which will result in the proper elevator position for maintaining a zero pitch rate.

In control systems where integration is required to obtain zero error characteristics, a linear integrator will provide an output which is directly proportional to the size of the error. Thus for a small error in the control system the output of the integrator will be very small thereby providing only small correction for the system in order to obtain the zero error characteristics. However, as will be well understood, if the integrator gain could be high at very small errors and decreases as the error gets larger, the integrator would be better able to make the error zero. Thus it is seen that a non-linear integrator will be of extreme utility in control systems requiring integration to obtain zero error. For with a non-linear integrator, as the error tries to build up, the integrator immediately has a strong restoring action and so prevents the error from building up. Yet, in cases where the step command is applied and the error is initially large, the integrator gain will be low. This action will keep the integrator excursions or false motions lower than if the integrator were linear. The overall response time of the system is thereby considerably improved.

Therefore, it is an object of this invention to provide a control system requiring integration to obtain zero error with an integrator having non-linear characteristics for providing high integrator gain for small errors in the control system.

It is a further object of this invention to provide a non-linear integrator to a control system to better enable the integrator to provide the zero error characteristics of the control system.

It is a still further object of this invention to provide a non-linear integrator to a control system, the non-linearity of the integrator being such that the integrator has a high gain for small errors and a decreasing gain for large errors.

A still further object of this invention is to provide a non-linear integrator to a control system such that the non-linearity of the integrator will maintain the integrator excursions to a small value and thereby increase the overall response time of the control system.

In carrying out this invention in one form, a non-linear integrator is utilized in a control system to compensate for gain changes in the system. The non-linear integrator characteristics are obtained by means of an integrator circuit comprising a motor producing an electrical signal as an output and utilizing non-linear feedback means to shape the feedback of the integrator circuit to provide the desired non-linearity.

This invention will be better understood and the manner in which its objects and advantages are obtained by a consideration of the following description taken in connection with the accompanying drawings in which:

FIGURE 1 is a simplified schematic diagram in block form of a control system showing one form of utilizing the invention;

FIGURE 2 is a graph indicating the desired integrator gain which may be obtained in accordance with this invention; and FIGURE 3 is a schematic diagram of the integrator circuit of FIGURE 1, showing one form of this invention.

Referring now to the drawings in which like numerals are used to indicate like parts throughout, and in particular with reference to FIGURE 1, the application of this invention in one form is shown in conjunction with a control system having an integrator circuit included therein, such integrator circuit being provided with the non-linear gain characteristics shown more particularly in FIGURE 2. The control system as shown in FIGURE 1 may be considered representative of a pitch rate command system of an automatic pilot, for obtaining the desired pitch rate of an aircraft. As shown in FIGURE 1, a command signal C is fed through a summing point 10 and thence over a line 12 to a junction 14, from which the signal is fed to the integrator circuit 16, the signal also being applied to a second summing point 18. From the summing point 18 the signal is fed to a servo mechanism 20 which may for example be a servo motor, a servo amplifier and a feedback means, such as for example as is shown in the patent application No. 607,336, filed August 31, 1956, in the name of Michael F. Marx, one of the inventors herein, and assigned to the same assignee as the present invention. The servo mechanism 20 is energized by means of the signal fed from summing point 18 and actuates the elevators 22 so as to cause the aircraft (not shown) to move in a desired manner. As the elevators 22 are moved by means of servo mechanism 20, the airplane (not shown) is caused to move, thereby actuating a pitch rate gyro 24, actuation being indicated by the dotted line 26, to cause the pitch rate gyro to develop or generate a signal which is proportional to the movement of the aircraft. The signal from the pitch rate gyro 24 is fed over a line 28 to summing point 10. At summing point 10 the command signal and the pitch rate gyro signal are compared with each other and the difference signal is fed over line 12 as an error signal E. The error signal E is again fed to the integrator circuit 16 and the summing point 18 at which point the output of the integrator circuit 16, indicated as A, is added to the error signal E to drive the servo mechanism 20. As will be understood by those skilled in the art, when the output of the pitch rate gyro 24 exactly equals the command signal C, the output from summing point 10 will be zero, thereby the error signal E being brought to zero.

However, in such instances as the operation of the pitch rate command system of an aircraft, it will be understood that, when the command C is zero, zero output of the pitch rate gyro is not necessarily obtained by the same position of the elevators 22. As is well known, the air speed, altitude and other conditions of the aircraft change and therefore, the zero pitch rate will require different positions of the elevator to trim the aircraft to maintain zero pitch rate. In such instances the integrator circuit 16 supplies the steady state signal indicated as A which will result in the proper elevator position to obtain zero pitch rate. Thus in the system shown in FIGURE 1, when the error signal E has become zero, the integrator circuit 16 will still maintain an output A which will be supplied through summing point 18 to the servo mechanisms 20 to thereby maintain the elevator 22 in a desired steady state position for obtaining zero pitch rate.

In cases where the command signal is not zero, it is desirable to have the pitch rate proportional to the command regardless of the gain of the aircraft. In this instance, as soon as the command signal is applied to the system set forth in FIGURE 1, the error E has a value which is immediately applied to servo mechanism 20 to move the elevators 22. The error signal also being applied to the integrator circuit 16 will cause the motor of the integrator circuit to immediately run in a manner so as to increase the signal applied to the servo mechanism to thereby increase the movement of the elevators 22. In this manner, the pitch rate is rapidly built up until the output of the pitch rate gyro 24 is exactly equal to the command signal C thereby obtaining a zero error. Thus it is seen that where there is a command signal in the system indicated in FIGURE 1, the integrator circuit 16 provides an additional output which is added to the error signal to more rapidly actuate the system to provide a feedback for obtaining zero error. Where a linear integrator is used, the integrator output is proportional to the input, that is to the error signal and therefore, the gain of the integrator is constant over the range of the error signals. Thus it is seen that for small errors the integrator does not aid in preventing the build up of larger errors by rapidly causing the system to approach a zero error. However, where a non-linear integrator is used having the gain characteristics indicated by the curve of FIGURE 2, then for a small error it will be noted that the integrator output is extremely high, that is that the integrator circuit has a high output for a small error signal. As the error signal becomes larger, such as for example by the insertion of a step signal, the integrator gain, which is the slope of the curve shown in FIGURE 2, is seen to be low, thereby providing a low gain for the high error signals. Thus it is seen that with a non-linear integrator for small errors the integrator immediately provides a strong restoring action to the system to prevent the errors from being built up in the system. Yet, for cases where a step command is applied and the error is initially large, the integrator gain is very low. This action keeps the integrator excursions lower than in a linear integrator and the overall response time of the control system is thereby considerably improved.

In FIGURE 3, one method of obtaining the desired non-linearity characteristics of the integrator circuit 16 is shown in detail. The integrator 16, as shown, comprises an adder amplifier 30, an amplifier 32, a motor 34, a tachometer 36, a feedback circuit being provided with a pair of diodes 38 and 40, and an output position pickoff 42 from the motor 34. As shown in FIGURE 3, the error signal from the summing point 10 is fed to the adder amplifiers 30 and on through the amplifier 32 to provide a signal for the actuation of the motor 34. As the motor 34 begins to run it drives the rotor of tachometer 36 thereby generating a signal in the windings 46 which signal is fed through the feedback circuit comprising diodes 38 and 40 to the adder amplifier 30.

The diodes 38 and 40 are preferably silicon diodes which have non-linear resistance characteristics such that for a very low signal input their resistance is high. However, as the strength of the input signal increases the resistance of the diodes decreases. That is, the resistance characteristics will be as shown in FIGURE 2, where the input signal strength is along the axis of abscissas while the resistance is along the axis of ordinates. Of course, it will be understood that means other than silicon diodes may be used, it only being necessary that such means be provided with the desired non-linear resistance characteristics.

For small error signals the motor 34 runs slowly thereby slowly driving tachometer 36 to provide a small tachometer output. The non-linear resistance characteristics of the diodes 38 and 40, oppositely poled as shown in FIGURE 3, are such that the diodes 38 and 40 will serve to prevent the output from being fed back to adder amplifier 30. Therefore, the error signal E is applied, without reduction, to motor 34. Thus, for low error signals the output of motor 34 is maintained high because very little feedback is provided due to the resistance characteristics of diodes 38 and 40. However, for large error signals the motor 34 is caused to run at a high speed thereby driving tachometer 36 at a high speed and generating a large feedback signal which is fed through the diodes 38 and 40 to the adder amplifier 30. This higher feedback substantially reduces the error signal E and thereby reduces the overall gain of the integrator device 16 shown in FIGURE 3. To provide an output from the motor to the summing point 18 when the error signal is zero, the position pickoff 42 is utilized. The position pickoff 42 is driven by motor 34 through a gear box 44. As is well known, the ratio of the gears in the gear box 44 is in the order of several hundred to one, thus providing a small movement of rotor 48 of position pickoff 42 for a number of revolutions of motor 34. In this instance the rotation of the motor drives the rotor 48 of position pickoff 42 thereby generating a signal in the stator 50 which signal is provided to summing point 18 as indicated in FIGURE 1. Thus when error signal E is removed from the circuit of FIGURE 3 the position of the position pickoff 42 will determine the amount of integrator signal which is still remaining in the stator 50 of the output and thus will determine the signal which is available to summing point 18 and to servo mechanism 20 to provide steady state trim position of elevators 22.

Thus it can be seen by means of the integrator circuit disclosed in FIGURE 3 an integrator device is provided with non-linear gain characteristics such as disclosed in FIGURE 2 whereby the overall response time of a control system can be greatly improved.

Of course, it will be understood that the non-linear integrator device of this invention is not limited to flight control systems. Many examples of other applications will readily occur to those skilled in the art, for example it could be utilized in a wire or tube extrusion machine. In such machines the material is drawn through dies which are generally glass lined to provide desired lubrication. When the drawing speed of such machine is not at the proper speed, the die temperature will be incorrect for proper lubrication. The drawing speed may experience upsets from such things as material buildup on the drawing reel, line variations in the motor supply voltage or temperature and other similar variations. An integrator being provided in such cases would monitor the drawing speed. The use of a non-linear integrator would enable a tighter operation of such machine at smaller errors and at the same time provide a better damping for sudden commands, than would be provided with a linear integrator.

While there has been shown and described in accordance with the patent statutes the preferred embodiment of the invention, it will be obvious to those skilled in the art that various changes or substitutions may be made without departing from the spirit and scope of the invention defined in the appended claims.

What is claimed as new and which is desired to be secured by Letters Patent of the United States is:

1. A non-linear integrator circuit for use with a control system to provide improved overall response characteristics of such system comprising, an amplifier and motor combination, said amplifier and motor combination being energized by the error signal in said system, feedback generating means actuated by said motor to provide a feedback signal output in opposition to said error signal to said amplifier and motor combination, a pair of parallel and reverse-connected diodes connected in series with the feedback signal generating means and said amplifier to provide a non-linear signal characteristic, said amplifier and motor combination thereby providing a non-linear output in conformance with the non-linearity of said feedback means.

2. In a pitch rate command system of an automatic pilot in which the pitch rate command signal is provided with a servo mechanism for actuating the elevators of such aircraft, said system being provided with a pitch rate gyro for generating a signal in response to movement of said elevators, the improvement comprising a non-linear integrator circuit for providing a steady state signal for the elevator trim of said aircraft to obtain zero pitch rate, said non-linear integrator circuit comprising an amplifier fed by the error signal of said control system, said amplifier energizing a motor to provide said steady state output signal, feedback means being provided in said amplifier and motor circuit, said feedback means including a diode circuit for generating a non-linear feedback signal depending upon the output of said motor, said motor providing output signals such that when said error signal of said system is zero said motor provides an output signal to said servo mechanism to maintain the elevators at a desired position to obtain zero pitch rate.

References Cited in the file of this patent

UNITED STATES PATENTS

| | | |
|---|---|---|
| 2,455,364 | Hays | Dec. 7, 1948 |
| 2,569,697 | Semm et al. | Oct. 2, 1951 |
| 2,668,264 | Williams | Feb. 2, 1954 |
| 2,674,708 | Husted | Apr. 6, 1954 |
| 2,913,654 | Clark | Nov. 17, 1959 |

OTHER REFERENCES

Terman, F. E.: Electronic and Radio Engineering, Fourth Edition, pages 621, 623, McGraw-Hill, New York, 1955.